(12) United States Patent
Hiura

(10) Patent No.: US 11,649,420 B2
(45) Date of Patent: May 16, 2023

(54) WATER-SOLUBLE FILM, CHEMICAL AGENT PACKAGE, AND METHOD OF PRODUCING WATER-SOLUBLE FILM

(71) Applicant: Mitsubishi Chemical Corporation, Tokyo (JP)

(72) Inventor: Takahiro Hiura, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 524 days.

(21) Appl. No.: 16/667,191

(22) Filed: Oct. 29, 2019

(65) Prior Publication Data

US 2020/0063076 A1   Feb. 27, 2020

Related U.S. Application Data

(63) Continuation of application No. PCT/JP2018/022493, filed on Jun. 12, 2018.

(30) Foreign Application Priority Data

Jun. 12, 2017 (JP) .............................. JP2017-115132

(51) Int. Cl.
*C11D 17/04* (2006.01)
*C11D 3/37* (2006.01)
(Continued)

(52) U.S. Cl.
CPC .......... *C11D 17/043* (2013.01); *B29C 41/003* (2013.01); *B29C 41/24* (2013.01);
(Continued)

(58) Field of Classification Search
None
See application file for complete search history.

(56) References Cited

U.S. PATENT DOCUMENTS 2,948,697 A * 8/1960 Robertson .............. C08K 5/521
524/557
3,061,884 A * 11/1962 Nagano ................... C08L 29/04
264/185

(Continued)

FOREIGN PATENT DOCUMENTS

CN   102834235 A   12/2012
JP   47-004315   2/1972
(Continued)

OTHER PUBLICATIONS

European Search Report issued for European Patent Application No. 18818868.4, dated May 4, 2020.
(Continued)

*Primary Examiner* — Lorna M Douyon
(74) *Attorney, Agent, or Firm* — Greenblum & Bernstein, P.L.C.

(57) ABSTRACT

A water-soluble film includes a polyvinyl alcohol resin (A) as a main component, wherein the ratio ($X_{TD}/X_{MD}$) of a degree of elongation ($X_{TD}$) in the transverse direction (TD) of the water-soluble film to a degree of elongation ($X_{MD}$) in the machine direction (MD) thereof when the water-soluble film is floated on the surface of water at 20° C. for 60 seconds is from 1.05 to 1.5. The water-soluble film exhibits reduced curling, exhibits reduced positional shift, and shows satisfactory sealability while forming a package.

7 Claims, 1 Drawing Sheet

TD 200 mm

MD 300 mm the length (A) of the curl diameter (51) Int. Cl.
  *B65D 65/46* (2006.01)
  *C08J 5/18* (2006.01)
  *B29C 41/24* (2006.01)
  *B29C 41/46* (2006.01)
  *B29C 41/00* (2006.01)
  *B29K 29/00* (2006.01)
  *B29L 7/00* (2006.01)

(52) U.S. Cl.
  CPC .............. *B29C 41/46* (2013.01); *B65D 65/46* (2013.01); *C08J 5/18* (2013.01); *C11D 3/3753* (2013.01); *B29K 2029/04* (2013.01); *B29L 2007/008* (2013.01); *C08J 2329/04* (2013.01)

(56) References Cited

U.S. PATENT DOCUMENTS

| | | | | |
|---|---|---|---|---|
| 3,313,870 | A * | 4/1967 | Yazawa | B29C 55/28 26/81 |
| 3,985,849 | A * | 10/1976 | Notomi | B29C 48/03 264/211 |
| 2004/0092635 | A1 * | 5/2004 | Kitamura | C08J 5/18 524/386 |
| 2007/0298234 | A1 * | 12/2007 | Oono | G02B 5/3033 428/220 |
| 2011/0189413 | A1 * | 8/2011 | Denome | C08L 29/04 524/387 |
| 2016/0102278 | A1 * | 4/2016 | Labeque | C08J 5/18 510/513 |
| 2018/0245028 | A1 | 8/2018 | Ookubo et al. | |
| 2018/0251613 | A1 | 9/2018 | Hiura et al. | |
| 2018/0251614 | A1 * | 9/2018 | Hiura | B29C 41/003 |
| 2018/0265656 | A1 * | 9/2018 | Oda | B29B 7/726 |

FOREIGN PATENT DOCUMENTS

| | | |
|---|---|---|
| JP | 01-281085 | 11/1989 |
| JP | 4-81947 | 7/1992 |
| JP | 2001-315141 | 11/2001 |
| JP | 2002-284905 | 10/2002 |
| JP | 2012032789 A * | 2/2012 |
| JP | 2017-102438 | 6/2017 |
| WO | 2012-002194 A1 | 1/2012 |
| WO | 2017/043508 | 3/2017 |
| WO | 2017/043509 A1 | 3/2017 |
| WO | WO 2017/043513 A1 * | 3/2017 |

OTHER PUBLICATIONS

ISR issued in WIPO Patent Application No. PCT/JP2018/022493, dated Sep. 4, 2018.
IPRP issued in WIPO Patent Application No. PCT/JP2018/022493, dated Dec. 17, 2019.
Chinese Office Action, Chinese Patent Office, Application No. 201880029420.9, dated Aug. 6, 2021, English translation.
Japanese Office Action, Japanese Patent Office, Application No. 2018-533269, dated Oct. 5, 2021, English translation.
Office Action issued in CN Patent Application No. 201880029420.9, dated Feb. 25, 2022, translation.

* cited by examiner the length (A) of the curl diameter

WATER-SOLUBLE FILM, CHEMICAL AGENT PACKAGE, AND METHOD OF PRODUCING WATER-SOLUBLE FILM

RELATED APPLICATION

This application is a continuation of International Application No. PCT/JP2018/022493, filed on Jun. 12, 2018, which claims priority to Japanese Patent Application No. 2017-115132, filed on Jun. 12, 2017, the entire contents of each of which being hereby incorporated by reference.

TECHNICAL FIELD

The present disclosure relates to a water-soluble film including a polyvinyl alcohol resin as a main component, and more specifically, to a water-soluble film that is suppressed from curling, and that can form a package free of strain and excellent in appearance characteristic when a chemical agent, such as a liquid detergent, is packaged.

A polyvinyl alcohol is hereinafter sometimes abbreviated as "PVA", and a water-soluble film including a polyvinyl alcohol resin as a main component is hereinafter sometimes abbreviated as "PVA water-soluble film".

BACKGROUND ART

A chemical agent portion package obtained by incorporating any one of various chemical agents, such as an agricultural chemical and a detergent, into a bag formed of a film of a PVA resin through the exploitation of water solubility of PVA has heretofore been proposed, and has been used in a wide variety of fields.

A water-soluble film to be used in such chemical agent packaging application is required to satisfy various characteristics, such as a mechanical characteristic and an appearance characteristic, in addition to excellent solubility. For example, when the film is turned into a package, the package shows satisfactory, sealability, does not undergo bag breakage, does not cause strain, and does not cause a reduction in tension.

As a water-soluble film to be used in such application, for example, there has been known a water-soluble film including a PVA resin and two kinds of plasticizers each having a specific melting point, which are incorporated in specific amounts into the PVA resin, the water-soluble film being capable of forming a package having the following features (see, for example, PTL1). The package has excellent mechanical characteristics, such as a high tensile strength and a high tensile elongation. In addition, even under a state in which a liquid is packaged in the package, the package has such a satisfactory appearance characteristic that the tension of the water-soluble film is not impaired with time.

RELATED ART DOCUMENT

Patent Document

PTL 1: WO-A1-2017/043508

SUMMARY

The water-soluble film disclosed in PTL1 described above can provide a package that has excellent mechanical characteristics and such an excellent appearance characteristic that a reduction in tension of the film with time does not occur. However, the film may curl depending on its production conditions, and when the curl of the water-soluble film occurs, at the time of, for example, the production of a package through the use of the water-soluble film, the handling of the film is liable to be difficult, or the positional shift thereof is liable to occur at the time of the sealing thereof. Accordingly, a concern is raised about a problem in that the production efficiency of the package reduces, and hence a further improvement of the film has been desired.

In view of the foregoing, under such background, according to the present disclosure, there are provided a water-soluble film that is suppressed from curling, that hardly causes a positional shift and shows satisfactory sealability at the time of the formation of a package, and that is excellent in appearance characteristic when turned into a package, and a chemical agent package obtained by using the film, and a method of producing a water-soluble film.

To provide such water-soluble film, chemical agent package, and production method, the inventor has made extensive investigations in view of such circumstances. As a result, the inventor has paid attention to film anisotropy in a PVA water-soluble film, and has found that such excellent effects on the productivity of a package as described below are exhibited by imparting anisotropy that a related-art water-soluble film does not have to the PVA water-soluble film, that is, setting a degree of elongation in the transverse direction of the film and a degree of elongation in the machine direction thereof so that the degree of elongation in the transverse direction may be larger than the degree of elongation in the machine direction. The curl of the film is suppressed. When the package is formed by using the water-soluble film, the film hardly causes the positional shift of a sealed portion and shows satisfactory sealability, in particular, is suitable for water sealing. Further, the deformation of the package can be suppressed.

In detail, it is typically considered that, as a difference between a degree of elongation in the transverse direction of a film and a degree of elongation in the machine direction thereof becomes smaller, a difference in tension between portions of the film is less liable to occur, and hence the film is less liable to curl. In the present disclosure, however, it has been found that, surprisingly, a water-soluble film that is suppressed from curling and is suitable for packaging applications is obtained when the following conditions are satisfied: there is a difference between a degree of elongation in the transverse direction of the film and a degree of elongation in the machine direction thereof, and a ratio between the degrees of elongation is adjusted within a specific range.

That is, the gist of the present disclosure relates to a water-soluble film, including a PVA resin (A) as a main component, wherein a ratio ($X_{TD}/X_{MD}$) of a degree of elongation ($X_{TD}$) in a transverse direction (TD) of the water-soluble film to a degree of elongation ($X_{MD}$) in a machine direction (MD) thereof when the water-soluble film is floated on a surface of water at 20° C. for 60 seconds is from 1.05 to 1.5.

According to one embodiment of the present disclosure, there are also provided a chemical agent package obtained by using the water-soluble film, and a method of producing the water-soluble film.

The water-soluble film of the present disclosure is suppressed from curling, and hence the film hardly causes a positional shift and shows satisfactory sealability at the time of the forming of a package. Further, the deformation of the package is suppressed. Accordingly, a package excellent in appearance characteristic is obtained.

Further, when the water-soluble film of the present disclosure has a water content of from 3 wt. % to 15 wt. %, the film is excellent in mechanical strength and heat sealability.

Further, when the PVA resin (A) includes an anionic group-modified PVA resin, the solubility of the water-soluble film becomes excellent.

Further, when the water-soluble film of the present disclosure is used for chemical agent packaging, a chemical agent can be used without the bag breakage of a package.

The chemical agent package including a package bag formed of the water-soluble film and a chemical agent packaged in the package bag can be simply used without any need for its bag breakage.

Further, in the case of the chemical agent package in which the chemical agent includes a detergent, labor for metering at the time of the use of the detergent can be eliminated, and hence the chemical agent package can be more simply used.

Further, in the case of the chemical agent package in which the chemical agent includes a liquid detergent, the chemical agent package can be even more simply used without the contamination of its surroundings with the liquid detergent.

When the method of producing the water-soluble film includes the steps of: casting a film-forming material containing the PVA resin (A), followed by drying to form a film; subjecting the film obtained by the film formation to heat treatment so that a temperature thereof is from 50° C. to 95° C.; and winding the heat-treated film at a draw ratio of from 1.05 to 1.5, the water-soluble film to be obtained is suppressed from curling, and hence hardly causes a positional shift and provides satisfactory sealability at the time of the forming of a package.

DESCRIPTION OF EMBODIMENTS

Figure 1:
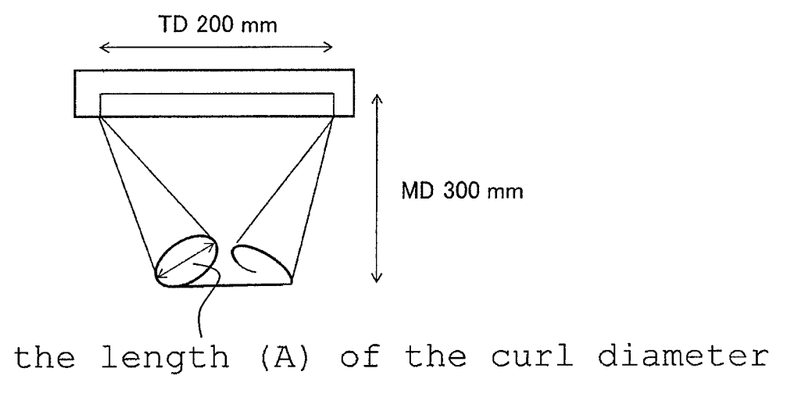
The FIGURE shows a view for describing a measurement condition for the length (A) of the curl diameter of a water-soluble film to be used at the time of the evaluation of the curling property of the film.

The present disclosure is specifically described below.

A water-soluble film of the present disclosure includes a PVA resin (A) as a main component, in which a ratio $(X_{TD}/X_{MD})$ of a degree of elongation $(X_{TD})$ in the transverse direction (TD) of the water-soluble film to a degree of elongation $(X_{MD})$ in the machine direction (MD) thereof when the water-soluble film is floated on the surface of water at 20° C. for 60 seconds is from 1.05 to 1.5.

In the present disclosure, the term "transverse direction of the film" generally refers to a direction substantially perpendicular to the longitudinal direction of the film. Particularly in a water-soluble film formed by ejecting and casting the PVA resin (A) on a casting die, such as a cast drum (drum-type roll) or an endless belt, the term refers to a direction substantially perpendicular to the machine direction of the film at the time of the film formation, and typically refers to a direction when a distance between both edges of the film becomes shortest. In the present disclosure, the transverse direction of the film is referred to as "TD", and the machine direction of the film is referred to as "MD".

The ratio $(X_{TD}/X_{MD})$ of the degree of elongation $(X_{TD})$ in the transverse direction (TD) to the degree of elongation $(X_{MD})$ in the machine direction (MD) is measured and calculated as described below.

First, the PVA water-soluble film is left to stand at 23° C. under a humidification condition of 50% RH for 24 hours. After that, the film is cut into a size measuring 150 mm by 150 mm under the environment, and a circle having a diameter of 75 mm is drawn in the central portion on a surface side opposite to a water surface side when the film is floated on a water surface with a water-based pen.

Further, lines $(S_{TD0})$ and $(S_{MD0})$ parallel to the TD and MD of the film, respectively, the lines each having a length equal to the diameter, that is, 75 mm, are drawn in the circle.

Next, the PVA water-soluble film is floated near the center of a water bath measuring 350 mm long by 250 mm wide, which is filled with water at 20° C., with its surface having drawn thereon the circle directed upward. After having been landed on the water, the film swells to gradually elongate, and the circle previously drawn on the film deforms along with the elongation of the film.

The lengths of two lines $(S_{TD60})$ and $(S_{MD60})$ drawn parallel to the TD and the MD, respectively 60 seconds after the film has been floated on the water surface are each measured, and the degree of elongation $(X_{TD})$ in the TD and the degree of elongation $(X_{MD})$ in the MD are each calculated from the ratio of the length after the elongation to the length before the elongation, followed by the determination of the ratio $(X_{TD}/X_{MD})$ therebetween.

The degree of elongation $(X_{TD})$ in the TD and the degree of elongation $(X_{MD})$ in the MD are calculated in accordance with the following equations.

$$X_{TD}(\%) = S_{TD60}/S_{TD0} \times 100$$

$$X_{MD}(\%) = S_{MD60}/S_{MD0} \times 100$$

The ratio $(X_{TD}/X_{MD})$ of the degree of elongation $(X_{TD})$ in the TD of the water-soluble film to the degree of elongation $(X_{MD})$ in the MD thereof, which is from 1.05 to 1.5, is preferably from 1.07 to 1.40, particularly preferably from 1.10 to 1.30. In the case where the ratio $(X_{TD}/X_{MD})$ between the degrees of elongation is excessively large, when the film is turned into a package, strain occurs to reduce the appearance characteristic and mechanical characteristics of the package, and in the case where the ratio is excessively small, a curl-suppressing effect reduces.

The water-soluble film of the present disclosure is produced, for example, as described below.

The water-soluble film of the present disclosure includes the PVA resin (A) as a main component. The phrase "includes as a main component" as used herein means that the content of the PVA resin (A) is typically 50 wt. % or more, preferably 55 wt. % or more with respect to the total amount of the water-soluble film.

First, the PVA resin (A) to be used in the present disclosure is described.

Examples of the PVA resin (A) to be used in the present disclosure include an unmodified PVA resin and a modified PVA resin.

The unmodified PVA resin may be produced by saponifying a vinyl ester polymer obtained by polymerizing a vinyl ester compound.

Examples of such vinyl ester compound include vinyl formate, vinyl acetate, vinyl trifluoroacetate, vinyl propionate, vinyl butyrate, vinyl caprate, vinyl laurate, vinyl versatate, vinyl palmitate, and vinyl stearate. Of those, vinyl acetate is preferably used. The vinyl ester compounds may be used alone or in combination thereof.

The modified PVA resin may be produced by copolymerizing the vinyl ester compound and an unsaturated monomer copolymerizable with the vinyl ester compound, and then saponifying the resultant copolymer.

Examples of the unsaturated monomer copolymerizable with the vinyl ester compound include: olefins, such as ethylene, propylene, isobutylene, α-octene, α-dodecene, and α-octadecene; hydroxy group-containing α-olefins, such as 3-buten-1-ol, 4-penten-1-ol, and 5-hexen-1-ol, and derivatives thereof, such as acylated products thereof; unsaturated acids, such as acrylic acid, methacrylic acid, crotonic acid, maleic acid, maleic anhydride, itaconic acid, and undecylenic acid, and salts, monoesters, or dialkyl esters thereof; amides, such as diacetone acrylamide, acrylamide, and methacrylamide; and olefin sulfonic acids, such as ethylenesulfonic acid, allylsulfonic acid, and methallylsulfonic acid, and salts thereof. Those unsaturated monomers may be used alone or in combination thereof.

In addition, the modified PVA resin is, for example, a resin having a primary hydroxy group in a side chain thereof in which, for example, the number of primary hydroxy groups in the side chain is typically from 1 to 5, preferably 1 or 2, particularly preferably 1, and the resin preferably further has a secondary hydroxy group in addition to the primary hydroxy group. Examples of such modified PVA resin include a PVA resin having a hydroxyalkyl group in a side chain thereof and a PVA resin having a 1,2-diol structural unit in a side chain thereof. The PVA resin having a 1,2-diol structural unit in a side chain thereof may be produced by, for example: (1) a method involving saponifying a copolymer of vinyl acetate and 3,4-diacetoxy-1-butene; (2) a method involving saponifying and decarboxylating a copolymer of vinyl acetate and vinyl ethylene carbonate; (3) a method involving saponifying and deketalizing a copolymer of vinyl acetate and a 2,2-dialkyl-4-vinyl-1,3-dioxolane; or (4) a method involving saponifying a copolymer of vinyl acetate and glycerin monoallyl ether.

A known polymerization method, such as a solution polymerization method, an emulsion polymerization method, or a suspension polymerization method, may be arbitrarily used as a copolymerization method for the vinyl ester compound and the unsaturated monomer copolymerizable with the vinyl ester compound. However, the copolymerization is typically performed by a solution polymerization method involving using an alcohol, such as methanol, ethanol, or isopropyl alcohol, as a solvent.

As a polymerization catalyst, known polymerization catalysts, such as azo catalysts including azobisisobutyronitrile, and peroxide catalysts including acetyl peroxide, benzoyl peroxide, and lauroyl peroxide, may be appropriately selected in accordance with the polymerization method. Those catalysts may be used alone or in combination thereof. In addition, the reaction temperature of the polymerization is selected from the range of from 50° C. to about the boiling point of the selected polymerization catalyst.

The saponification may be performed by a known method, and is typically performed in the presence of a saponification catalyst by dissolving the resultant copolymer in an alcohol. Examples of the alcohol include methanol, ethanol, and butanol. Those alcohols may be used alone or in combination thereof. The concentration of the copolymer in the alcohol is selected from the range of from 20 wt. % to 50 wt. % from the viewpoint of a dissolution rate.

For example, alkali catalysts, such as hydroxides and alcoholates of alkali metals including sodium hydroxide, potassium hydroxide, sodium methylate, sodium ethylate, and potassium methylate, may each be used as the saponification catalyst, and an acid catalyst may also be used. Those catalysts may be used alone or in combination thereof. The usage amount of the saponification catalyst is preferably set to from 1 millimole equivalent to 100 millimole equivalents with respect to the vinyl ester compound.

As the modified PVA resin to be used in the present disclosure, an anionic group-modified PVA resin is preferably used in terms of solubility. Examples of the kind of the anionic group include a carboxyl group, a sulfonic acid group, and a phosphoric acid group. Of those, a carboxyl group and a sulfonic acid group are preferred in terms of the chemical resistance of the film and the stability thereof with time, and a carboxyl group is particularly preferred.

The carboxyl group-modified PVA resin may be produced by an arbitrary method, and examples thereof may include: (i) a method involving copolymerizing an unsaturated monomer having a carboxyl group and a vinyl ester compound, and then saponifying the resultant copolymer; and (ii) a method involving polymerizing the vinyl ester compound while causing, for example, an alcohol, aldehyde, or thiol having a carboxyl group to coexist as a chain transfer agent, and then saponifying the resultant polymer.

The above-mentioned compounds may each be used as the vinyl ester compound in the method (i) or (ii). Of those, vinyl acetate is preferably used.

Examples of the unsaturated monomer having a carboxyl group in the method (i) include monomers, such as ethylenically unsaturated dicarboxylic acids (e.g., maleic acid, fumaric acid, and itaconic acid), ethylenically unsaturated dicarboxylic acid monoesters (e.g., maleic acid monoalkyl ester, fumaric acid monoalkyl ester, and itaconic acid monoalkyl ester), ethylenically unsaturated dicarboxylic acid diesters (e.g., maleic acid dialkyl ester, fumaric acid dialkyl ester, and itaconic acid dialkyl ester), provided that those diesters are each required to be transformed into a carboxyl group by hydrolysis at the time of saponification of the copolymer, ethylenically unsaturated carboxylic acid anhydrides (e.g., maleic anhydride and itaconic anhydride), and ethylenically unsaturated monocarboxylic acids (e.g., (meth)acrylic acid and crotonic acid), and salts thereof. Of those, maleic acid, the maleic acid monoalkyl ester, the maleic acid dialkyl ester, the maleic acid salt, maleic anhydride, itaconic acid, the itaconic acid monoalkyl ester, the itaconic acid dialkyl ester, (meth)acrylic acid, and the like are preferably used, maleic acid, the maleic acid monoalkyl ester, the maleic acid dialkyl ester, the maleic acid salt, and maleic anhydride are particularly preferably used, and the maleic acid monoalkyl ester is more preferably used. Those monomers may be used alone or in combination thereof.

In the method (ii), a compound derived from a thiol, the compound having a particularly large chain transfer effect, is effectively used, and examples thereof include compounds represented by the following general formulae (1) to (3) and salts thereof.

(1)

(2)

In the general formulae (1) and (2), "n" represents an integer of from 0 to 5, and $R_1$, $R_2$, and $R_3$ each represent a hydrogen atom or a lower alkyl group (that may contain a substituent).

(3)

In the general formula (3), "n" represents an integer of from 0 to 20.

Specific examples thereof include mercaptoacetic acid, 2-mercaptopropionic acid, 3-mercaptopropionic acid, and 2-mercaptostearic acid. Those compounds may be used alone or in combination thereof.

The polymerization may be performed by incorporating any other general monomer in addition to the unsaturated monomer having a carboxyl group and the vinyl ester compound to the extent that the water solubility of the resin to be obtained is not impaired, and for example, an alkyl ester of an ethylenically unsaturated carboxylic acid, an allyl ester of a saturated carboxylic acid, an α-olefin, an alkyl vinyl ether, an alkyl allyl ether, (meth)acrylamide, (meth) acrylonitrile, styrene, or vinyl chloride may be used as such monomer.

In addition, a method of producing the carboxyl group-modified PVA resin is not limited to the above-mentioned methods, and for example, a method involving causing a carboxyl group-containing compound having a functional group having reactivity with a hydroxy group, such as a dicarboxylic acid, an aldehyde carboxylic acid, or a hydroxycarboxylic acid, to post-react with polyvinyl alcohol (a partially saponified product or a completely saponified product) may also be performed.

In addition, when a sulfonic acid-modified PVA resin, which is modified with a sulfonic acid group, is used, the sulfonic acid-modified PVA resin may be produced by, for example, a method involving copolymerizing a copolymerizable component, such as vinylsulfonic acid, styrenesulfonic acid, allylsulfonic acid, methallylsulfonic acid, or 2-acrylamido-2-methylpropanesulfonic acid, and a vinyl ester compound, and then saponifying the resultant copolymer, or a method involving subjecting, for example, vinylsulfonic acid or a salt thereof, or 2-acrylamido-2-methylpropanesulfonic acid or a salt thereof to Michael addition to PVA.

Meanwhile, an example of the method involving post-modifying the unmodified PVA resin is a method involving subjecting the unmodified PVA resin to acetoacetic acid esterification, acetalization, urethanation, etherification, grafting, phosphoric acid esterification, or oxyalkylenation.

The average saponification degree of the PVA resin (A) of the present disclosure is preferably 80 mol % or more, particularly preferably from 82 mol % to 99.9 mol %, more preferably from 85 mol % to 99.5 mol %, still more preferably from 90 mol % to 99.0 mol %. When such average saponification degree is excessively small, the solubility of the film tends to reduce with time depending on the pH of a chemical agent to be packaged.

In particular, in the present disclosure, when the unmodified PVA resin is used as the PVA resin (A), its average saponification degree is preferably 80 mol % or more, particularly preferably from 82 mol % to 99 mol %, more preferably from 85 mol % to 90 mol %. When such average saponification degree is excessively small, the water solubility of the film tends to reduce. Also, when the average saponification degree is excessively large, the water solubility tends to reduce.

Meanwhile, when the modified PVA resin is used as the PVA resin (A), its average saponification degree is preferably 80 mol % or more, particularly preferably from 85 mol % to 99.9 mol %, more preferably from 90 mol % to 99.0 mol %. When such average saponification degree is excessively small, the solubility of the film tends to reduce with time depending on the pH of a chemical agent to be packaged. When the average saponification degree is excessively large, the solubility of the film in water tends to largely reduce owing to thermal history at the time of film formation.

Further, when the anionic group-modified PVA resin is used as the PVA resin (A), its average saponification degree is preferably 85 mol % or more, particularly preferably from 88 mol % to 99.9 mol %, more preferably from 90 mol % to 99.5 mol %, still more preferably from 90 mol % to 99.0 mol %.

In addition, the 4 wt. % aqueous solution viscosity of the PVA resin (A) of the present disclosure at 20° C. is preferably from 10 mPa·s to 50 mPa·s, particularly preferably from 15 mPa·s to 45 mPa·s, more preferably from 20 mPa·s to 40 mPa·s. When such viscosity is excessively small, the mechanical strength of the film serving as a packaging material tends to reduce. When the viscosity is excessively large, the aqueous solution viscosity of the resin at the time of film formation is high, and hence the productivity of the film tends to reduce.

In the present disclosure, the modification amount of the anionic group-modified PVA resin is preferably from 1 mol % to 10 mol %, particularly preferably from 2 mol % to 9 mol %, more preferably from 2 mol % to 8 mol %. When such modification amount is excessively small, the solubility of the resin in water tends to reduce. When the modification amount is excessively large, the productivity of the PVA resin tends to reduce, or the biodegradability thereof tends to reduce. In addition, the blocking of the water-soluble film tends to be liable to occur.

In the present disclosure, each of the above-mentioned PVA resins (A) may be used alone. In addition, the unmodified PVA resins may be used in combination, the modified PVA resins may be used in combination, or the unmodified PVA resin and the modified PVA resin may be used in combination. Further, for example, two or more kinds of PVA resins different from each other in saponification degree, viscosity, modifying group, modification amount, or the like may be used in combination.

In the present disclosure, the PVA resin (A) is preferably the modified PVA resin because its solubility can be held for a long time period, and is particularly preferably the anionic group-modified PVA resin, more preferably the carboxyl group-modified PVA resin. In addition, the water-soluble film preferably contains the anionic group-modified PVA resin and the unmodified PVA resin in terms of a film strength, and the film particularly preferably contains the carboxyl group-modified PVA resin and the unmodified PVA resin.

With regard to a content ratio (weight ratio) in the case where the modified PVA resin and the unmodified PVA resin are used in combination, the ratio "modified PVA resin/unmodified PVA resin" is preferably from 95/5 to 60/40, particularly preferably from 94/6 to 70/30, more preferably from 93/7 to 80/20. When such content ratio is excessively small, the water solubility of the film tends to reduce, and when the content ratio is excessively large, the water solubility thereof after the packaging of an acidic substance tends to reduce.

In addition, when the modified PVA resin and the unmodified PVA resin are used in combination, the 4 wt. % aqueous solution viscosity of the unmodified PVA resin at 20° C. is preferably from 5 mPa·s to 50 mPa·s, particularly preferably from 10 mPa·s to 45 mPa·s, more preferably from 12 mPa·s to 40 mPa·s, still more preferably from 15 mPa·s to 35 mPa·s. When such viscosity is excessively small, the mechanical strength of the film serving as a packaging material tends to reduce. Meanwhile, when the viscosity is excessively large, the aqueous solution viscosity of the resin at the time of film formation is high, and hence the productivity of the film tends to reduce.

The average saponification degree is measured in conformity with JIS K 6726 3.5, and the 4 wt. % aqueous solution viscosity is measured in conformity with JIS K 6726 3.11.2.

In the present disclosure, a plasticizer (B) is preferably incorporated into the PVA resin (A) in terms of the impartment of flexibility to the film when the film is turned into a package. Although the plasticizers (B) may be used alone or in combination thereof, at least two kinds thereof are preferably used in combination because of the following reasons: the film itself has high toughness when turned into a package; and the film can be sealed at low temperature, and a sealed portion has a high strength.

It is preferred that one kind of such plasticizers (B) be a polyhydric alcohol (b1) having a melting point of 80° C. or more (hereinafter sometimes abbreviated as "plasticizer (b1)"), and the other kind thereof be a polyhydric alcohol (b2) having a melting point of 50° C. or less (hereinafter sometimes abbreviated as "plasticizer (b2)") in terms of: toughness at the time of the production of the water-soluble film or at the time of the production of a package; and the shape stability of the film with time and the sealability thereof at low temperature when the film is turned into a package for a liquid detergent.

As the polyhydric alcohol (b1) having a melting point of 80° C. or more, many kinds of sugar alcohols, monosaccharides, and polysaccharides may be applied. Of those, examples thereof include: dihydric alcohols, such as salicyl alcohol (83° C.), catechol (105° C.), resorcinol (110° C.), hydroquinone (172° C.), bisphenol A (158° C.), bisphenol F (162° C.), and neopentyl glycol (127° C.); trihydric alcohols, such as phloroglucinol (218° C.); tetrahydric alcohols, such as erythritol (121° C.), threitol (88° C.), and pentaerythritol (260° C.); pentahydric alcohols, such as xylitol (92° C.), arabitol (103° C.), fucitol (153° C.), glucose (146° C.), and fructose (104° C.); hexahydric alcohols, such as mannitol (166° C.), sorbitol (95° C.), and inositol (225° C.); octahydric alcohols, such as lactitol (146° C.), sucrose (186° C.), and trehalose (97° C.); and nonahydric or higher alcohols, such as maltitol (145° C.). Those alcohols may be used alone or in combination thereof. Melting points are shown in the parentheses.

Of those, a polyhydric alcohol having a melting point of 85° C. or more is preferred in terms of the tensile strength of the water-soluble film, and a polyhydric alcohol having a melting point of 90° C. or more is particularly preferred. The upper limit of the melting point is preferably 300° C., particularly preferably 200° C.

Further, in the present disclosure, the number of hydroxy groups in a molecule of the plasticizer (b1) is preferably 4 or more in terms of compatibility with the PVA resin (A), and is particularly preferably from 5 to 10, more preferably from 6 to 8. Suitable specific examples of the plasticizer satisfying such condition include sorbitol, sucrose, and trehalose.

In addition, in the present disclosure, the molecular weight of the plasticizer (b1) is preferably 150 or more in terms of the toughness of the water-soluble film, and is particularly preferably from 160 to 500, more preferably from 180 to 400. Suitable specific examples of the plasticizer satisfying such condition include sorbitol and sucrose.

Meanwhile, examples of the polyhydric alcohol (b2) having a melting point of 50° C. or less include aliphatic alcohols, for example, preferably include: dihydric alcohols, such as ethylene glycol (−13° C.), diethylene glycol (−11° C.), triethylene glycol (−7° C.), propylene glycol (−59° C.), tetraethylene glycol (−5.6° C.), 1,3-propanediol (−27° C.), 1,4-butanediol (20° C.), 1,6-hexanediol (40° C.), tripropylene glycol, and polyethylene glycol having a molecular weight of 2,000 or less; and trihydric or higher alcohols, such as glycerin (18° C.), diglycerin, and triethanolamine (21° C.). Those alcohols may be used alone or in combination thereof. Melting points are shown in the parentheses. Of those, a polyhydric alcohol having a melting point of 30° C. or less is particularly preferred in terms of the flexibility of the water-soluble film, and a polyhydric alcohol having a melting point of 20° C. or less is more preferred. The lower limit of the melting point is typically −80° C., preferably −10° C., particularly preferably 0° C.

Further, in the present disclosure, the number of hydroxy groups in a molecule of the plasticizer (b2) is preferably 4 or less, and is particularly preferably 3 or less because the control of the flexibility near normal temperature (25° C.) is facilitated. Specifically, for example, glycerin is suitable as the plasticizer satisfying such condition.

In addition, in the present disclosure, the molecular weight of the plasticizer (b2) is preferably 100 or less because the control of the flexibility is facilitated, and is particularly preferably from 50 to 100, more preferably from 60 to 95. Specifically, for example, glycerin is suitable as the plasticizer satisfying such condition.

In the present disclosure, a plasticizer (b3) except the plasticizers (b1) and (b2) may be used in combination. Examples of such plasticizer (b3) include: alcohols, such as trimethylolpropane (58° C.), diethylene glycol monomethyl ether, cyclohexanol, carbitol, and polypropylene glycol; ethers, such as dibutyl ether; carboxylic acids, such as stearic acid, oleic acid, linoleic acid, linolenic acid, sorbic acid, citric acid, and adipic acid; ketones, such as cyclohexanone; amines, such as monoethanolamine, triethanolamine, ethylenediamine, and an imidazole compound; and amino acids, such as alanine, glycine, aspartic acid, glutamic acid, histidine, lysine, and cysteine. Those plasticizers may be used alone or in combination thereof.

In the present disclosure, the content of the plasticizer (B) is preferably 20 parts by weight or more, particularly preferably from 25 parts by weight to 70 parts by weight, more preferably from 30 parts by weight to 60 parts by weight, still more preferably from 35 parts by weight to 50 parts by weight with respect to 100 parts by weight of the PVA resin (A). When such content of the plasticizer (B) is excessively small, in the case where a package is provided by packaging a liquid, such as a liquid detergent, with the water-soluble film, the toughness of the water-soluble film tends to be impaired with time. When the content is excessively large, the mechanical strength of the film tends to reduce.

In addition, the content weight ratio (b1/b2) of the plasticizer (b1) to the plasticizer (b2) is preferably from 0.1 to 5, particularly preferably from 0.2 to 4, more preferably from 0.5 to 3, still more preferably from 0.7 to 2. When such content ratio is excessively small, the water-soluble film tends to be so soft that its blocking is liable to occur, and when the content ratio is excessively large, the water-soluble film tends to be so hard as to be brittle under a low-humidity environment.

In addition, with regard to the contents of the plasticizer (b1) and the plasticizer (b2), the content of the plasticizer (b1) is preferably from 5 parts by weight to 40 parts by weight, particularly preferably from 8 parts by weight to 30 parts by weight, more preferably from 10 parts by weight to 25 parts by weight with respect to 100 parts by weight of the PVA resin (A), and the content of the plasticizer (b2) is preferably from 5 parts by weight to 40 parts by weight, particularly preferably from 10 parts by weight to 35 parts by weight, more preferably from 15 parts by weight to 30 parts by weight with respect thereto.

When such content of the plasticizer (b1) is excessively small, the water-soluble film tends to be excessively hard, and when the content is excessively large, the water-soluble film tends to be excessively soft. In addition, when the content of the plasticizer (b2) is excessively small, the water-soluble film tends to be excessively hard or tends to be brittle under a low-humidity environment, and when the content is excessively large, the water-soluble film tends to be so soft that its blocking is liable to occur.

Further, the total amount of the plasticizer (b1) and the plasticizer (b2) is preferably 70 wt. % or more, more preferably 80 wt. % or more, particularly preferably 87 wt. % or more, still more preferably 90 wt. % or more, even still more preferably 95 wt. % or more with respect to the entirety of the plasticizer (B), and it is most preferred that the entirety of the plasticizer (B) be formed only of the plasticizer (b1) and the plasticizer (b2). When such total amount of the plasticizers (b1) and (b2) is excessively small, the mechanical strength of the water-soluble film tends to reduce.

In the present disclosure, a filler (C), a surfactant (D), or the like may be further incorporated as required.

The filler (C) to be used in the present disclosure is incorporated for the purpose of the blocking resistance of the water-soluble film. Specific examples thereof include an inorganic filler and an organic filler. Of those, the organic filler is preferred. In addition, the average particle diameter of the filler is preferably from 0.1 μm to 20 μm, particularly preferably from 0.5 μm to 15 μm. The average particle diameter may be measured with, for example, a laser diffraction-type particle size distribution-measuring apparatus.

The average particle diameter of the inorganic filler is preferably from 1 μm to 10 μm. When such average particle diameter is excessively small, the effect of the dispersibility of the water-soluble film in water tends to be small. When the average particle diameter is excessively large, at the time of the stretching of the water-soluble film in its forming processing, a pinhole tends to occur, or its appearance tends to be poor.

Specific examples of the inorganic filler include talc, clay, silicon dioxide, diatomaceous earth, kaolin, mica, asbestos, gypsum, graphite, glass balloons, glass beads, calcium sulfate, barium sulfate, ammonium sulfate, calcium sulfite, calcium carbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, and potassium chromate. Those inorganic fillers may be used alone or in combination thereof.

The average particle diameter of the organic filler is preferably from 0.5 μm to 20 μm, particularly preferably from 0.5 μm to 10 μm, more preferably from 0.5 μm to 7 μm, still more preferably from 0.5 μm to 5 μm. When such average particle diameter is excessively small, cost for the formation of the water-soluble film tends to increase. When the average particle diameter is excessively large, at the time of the stretching of the water-soluble film in its forming processing, a pinhole tends to occur.

Examples of such organic filler include biodegradable resins, such as starch, a melamine resin, a polymethyl (meth)acrylate resin, a polystyrene resin, and a polylactic acid. Of those, a biodegradable resin, such as a polymethyl (meth)acrylate resin, a polystyrene resin, or starch, is preferably used. Those fillers may be used alone or in combination thereof.

Examples of the starch include raw starches (e.g., corn starch, potato starch, sweet potato starch, wheat starch, cassava starch, sago starch, tapioca starch, sorghum starch, rice starch, legume starch, pueraria starch, bracken starch, *Nelumbo nucifera* starch, and water chestnut starch), physically modified starches (e.g., α-starch, fractionated amylose, and heat-moisture-treated starch), enzymatically modified starches (e.g., hydrolyzed dextrin, enzyme-decomposed dextrin, and amylose), chemically degraded starches (e.g., acid-treated starch, hypochlorous acid-oxidized starch, and dialdehyde starch), and chemically modified starch derivatives (e.g., esterified starch, etherified starch, cationized starch, and cross-linked starch). Those starches may be used alone or in combination thereof. Of those, the raw starches, in particular, the corn starch or the rice starch is preferably used in terms of ease of availability and economic efficiency.

The content of the filler (C) is preferably from 1 part by weight to 30 parts by weight, particularly preferably from 2 parts by weight to 25 parts by weight, more preferably from 2.5 parts by weight to 20 parts by weight with respect to 100 parts by weight of the PVA resin (A). When such content is excessively small, the blocking resistance of the water-soluble film tends to reduce. When the content is excessively large, at the time of the stretching of the water-soluble film in its forming processing, a pinhole tends to occur.

The surfactant (D) to be used in the present disclosure is incorporated for the purpose of improving peelability from a cast surface at the time of the formation of the water-soluble film. Examples thereof include a nonionic surfactant, a cationic surfactant, and an anionic surfactant. Specific examples thereof include polyoxyethylene nonyl phenyl ether, polyoxyethylene octyl nonyl ether, polyoxyethylene dodecyl phenyl ether, polyoxyethylene alkyl allyl ethers, polyoxyethylene sorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers, such as polyoxyethylene laurylamino ether and polyoxyethylene stearylamino ether. Those surfactants may be used alone or in combination thereof. Of those, the polyoxyalkylene alkyl ether phosphate monoethanolamine salts and polyoxyethylene laurylamino ether are suitable in terms of production stability.

The content of such surfactant (D) is preferably from 0.01 parts by weight to 4 parts by weight, particularly preferably from 0.1 parts by weight to 3 parts by weight, more preferably from 0.5 parts by weight to 2.5 parts by weight with respect to 100 parts by weight of the PVA resin (A). When such content is excessively small, peelability between the cast surface of a film-forming apparatus and the formed water-soluble film tends to reduce to cause a reduction in productivity of the film. When the content is excessively large, an inconvenience, such as a reduction in adhesive strength at the time of sealing to be performed in the case where the water-soluble film is formed into a package, tends to occur.

In the present disclosure, for example, another water-soluble polymer (e.g., sodium polyacrylate, polyethylene oxide, polyvinylpyrrolidone, dextrin, chitosan, chitin, methyl cellulose, or hydroxyethyl cellulose), a perfume, a rust inhibitor, a colorant, an extender, an antifoaming agent, a UV absorber, a fluorescent whitening agent, liquid paraffins, or a bitter component (e.g., denatoniumbenzoate) may be further incorporated to the extent that the object of the present disclosure is not inhibited. Those components may be used alone or in combination thereof.

In addition, in the present disclosure, an antioxidant is preferably blended in terms of the suppression of yellowing. Examples of such antioxidant include: sulfurous acid salts, such as sodium sulfite, potassium sulfite, calcium sulfite, and ammonium sulfite; tartaric acid; ascorbic acid; sodium thiosulfate; catechol; and Rongalite. Of those, the sulfurous acid salts are preferred, and sodium sulfite is particularly preferred. The blending amount of such antioxidant is preferably from 0.1 parts by weight to 10 parts by weight, particularly preferably from 0.2 parts by weight to 5 parts by weight, more preferably from 0.3 parts by weight to 3 parts by weight with respect to 100 parts by weight of the PVA resin (A).

<Production of PVA Water-Soluble Film>

In the present disclosure, as described above, a PVA resin composition containing the PVA resin (A), preferably further containing the plasticizer (B), and further containing, for example, the filler (C) and the surfactant (D) as required is obtained, and such PVA resin composition is subjected to [I] a dissolving step, [II] a film-forming step, and [III] a winding step in the stated order to provide a PVA water-soluble film.

[[I] Dissolving Step]

In the dissolving step, the PVA resin composition is dissolved or dispersed with water to prepare an aqueous solution or an aqueous dispersion serving as a film-forming raw material.

Normal-temperature dissolution, high-temperature dissolution, pressure dissolution, or the like is typically adopted as a dissolution method at the time of dissolving the PVA resin composition in water. Of those, the high-temperature dissolution and the pressure dissolution are preferred because each of the methods produces a small amount of undissolved matter and is hence excellent in productivity.

A dissolution temperature is typically from 80° C. to 100° C., preferably from 90° C. to 95° C. in the case of the high-temperature dissolution, and is typically from 80° C. to 130° C., preferably from 90° C. to 120° C. in the case of the pressure dissolution.

A dissolution time, which only needs to be appropriately adjusted in accordance with the dissolution temperature and a pressure at the time of the dissolution, is typically from 1 hour to 20 hours, preferably from 2 hours to 15 hours, particularly preferably from 3 hours to 10 hours. When the dissolution time is excessively short, the undissolved matter tends to remain, and when the dissolution time is excessively long, the productivity tends to reduce.

In addition, in the dissolving step, a stirring blade is, for example, a paddle, FULLZONE, MAXBLEND, TWIN-STAR, anchor, ribbon, or propeller stirring blade.

Further, after the dissolution, the resultant PVA resin aqueous solution is subjected to degassing treatment, and a method for such degassing is, for example, static degassing, vacuum degassing, or biaxial extrusion degassing. Of those, the static degassing or the biaxial extrusion degassing is preferred.

The static degassing is performed at a temperature of typically from 50° C. to 100° C., preferably from 70° C. to 95° C., and its degassing time is typically from 2 hours to 30 hours, preferably from 5 hours to 20 hours.

The solid content concentration of such film-forming raw material is preferably from 10 wt. % to 50 wt. %, particularly preferably from 15 wt. % to 40 wt. %, more preferably from 20 wt. % to 35 wt. %. When such concentration is excessively low, the productivity of the film tends to reduce, and when the concentration is excessively high, the viscosity of the film-forming raw material tends to be so high that the degassing of the film-forming raw material requires time or a die line occurs at the time of the formation of the film.

[[II] Film-forming Step]

In the film-forming step, the film-forming raw material prepared in the dissolving step is formed into a film shape, and is subjected to drying treatment as required to be adjusted to a PVA water-soluble film having a water content of less than 15 wt. %. At the time of the film formation, a method such as a melt extrusion method or a casting method may be adopted, and the casting method is preferred in terms of the accuracy of the thickness of the film.

When the casting method is performed, the PVA water-soluble film of the present disclosure may be produced by, for example, ejecting the film-forming raw material from a slit of a T-shaped slit die or the like to cast the raw material on a cast surface, such as the metal surface of an endless belt or a drum roll, and drying the raw material.

The temperature of the film-forming raw material in the film-forming raw material-ejecting portion of the T-shaped slit die or the like is preferably from 60° C. to 98° C., particularly preferably from 70° C. to 95° C. When such temperature is excessively low, the viscosity of the film-forming raw material tends to increase to reduce the productivity of the PVA water-soluble film, and when the temperature is excessively high, foaming or the like tends to occur in the raw material.

After the casting, the film-forming raw material is dried on the cast surface. The drying is typically performed by heating the cast surface, such as the metal surface of an endless belt or a drum roll. The surface temperature of the cast surface is preferably from 50° C. to 150° C., particularly preferably from 60° C. to 140° C. When such surface temperature is excessively low, the water content of the film increases owing to insufficient drying, and hence its blocking tends to be liable to occur. When the surface temperature is excessively high, the film-forming raw material tends to foam to lead to a film formation failure.

In addition, in the drying at the time of the film formation, for example, drying with a heat roll, drying in which hot air is blown against the film with a floating dryer, and drying with a far-infrared ray apparatus or an induction heating apparatus may be used in combination.

After the film-forming raw material has been dried so as to have a water content of less than 15 wt. % in the drying treatment, the PVA water-soluble film is obtained by being peeled from the cast surface (when drying with a heat roll is further performed after the peeling from the cast surface, by being peeled from the drying heat roll). The PVA water-soluble film peeled from the cast surface (or the drying heat roll) is conveyed while being cooled under an environment at from 10° C. to 35° C.

[[III] Winding Step]

In the winding step, the PVA water-soluble film peeled from the cast surface or the like in the film-forming step is conveyed and wound, and is wound around a core pipe (S1) to prepare a film roll.

Although the resultant film roll may be supplied as it is as a product, the film roll may be preferably wound around a core pipe (S2) having a length commensurate with the width of the PVA water-soluble film of a desired size again to be supplied as a film roll having the desired size.

The core pipe (S1) around which the PVA water-soluble film is wound is cylindrical, and a metal, a plastic, or the like may be appropriately selected as a material therefor, but the metal is preferred in terms of the fastness and strength of the core pipe. The inner diameter of the core pipe (S1) is preferably from 3 cm to 30 cm, more preferably from 10 cm to 20 cm.

The wall thickness of the core pipe (S1) is preferably from 1 mm to 30 mm, more preferably from 2 mm to 25 mm.

The length of the core pipe (S1) needs to be made longer than the width of the PVA water-soluble film, and the core pipe is preferably made to protrude from each of the end portions of the film roll by from 1 cm to 50 cm.

In addition, the core pipe (S2) is cylindrical, and paper, a metal, a plastic, or the like may be appropriately selected as a material therefor, but the paper is preferred in terms of a reduction in weight of the core pipe and the handling thereof.

The inner diameter of the core pipe (S2) is preferably from 3 cm to 30 cm, more preferably from 10 cm to 20 cm.

The wall thickness of the core pipe (S2) is preferably from 1 mm to 30 mm, more preferably from 3 mm to 25 mm.

The length of the core pipe (S2) only needs to be a length equal to or longer than the width of the PVA water-soluble film serving as a product, and is preferably equal to or longer than the width by up to 50 cm.

The PVA water-soluble film is slit into a desired width when wound around the core pipe (S2).

At the time of such slitting, the film is slit with a shear blade, a razor blade, or the like, but is preferably slit with the shear blade in terms of the smoothness of a slit section.

When the degrees of elongation of the PVA water-soluble film of the present disclosure are adjusted, in a production process for such film, it is important that, after [II] the film-forming step, the film be subjected to heat treatment so that its temperature may fall within a specific temperature range, and a draw ratio be adjusted within a specific range.

A heat treatment method and a method of adjusting the draw ratio are described below.

The heat treatment in the present disclosure is performed after the film-forming step separately from the drying at the time of the film formation, and is performed for the purpose of alleviating the residual stress of the film occurring at the time of the adjustment of the draw ratio to adjust the degree of elongation in the transverse direction thereof.

In the heat treatment, the heat treatment is preferably performed so that the temperature of the film may be from 50° C. to 95° C., and the temperature is particularly preferably from 55° C. to 90° C., more preferably from 60° C. to 85° C., still more preferably from 65° C. to 80° C. When such temperature is excessively low, a curl-alleviating effect tends to be hardly obtained, and when the temperature is excessively high, the solubility of the film tends to reduce, or the sealability (in particular, water sealability) thereof tends to reduce at the time of the forming of a package.

The term "temperature of the film" refers to a temperature measured on the surface of the film immediately after the performance of the heat treatment with an infrared thermograph, and specifically refers to a numerical value obtained by measuring the temperature of the film at a position distant from the outlet of a heat treatment apparatus by 5 cm. The temperature may be measured with a commercial infrared thermograph (e.g., "FLIR C2" manufactured by FLIR Systems, Inc.).

Specifically, when the heat treatment is performed, the temperature at which the film is subjected to the heat treatment (the temperature of the heat treatment apparatus) is preferably from 50° C. to 120° C., particularly preferably from 60° C. to 115° C., more preferably from 70° C. to 110° C. When such temperature is excessively low, a curl-alleviating effect tends to be hardly obtained, and when the temperature is excessively high, the solubility of the film tends to reduce, or the sealability (in particular, water sealability) thereof tends to reduce at the time of the forming of a package.

A heat treatment time, which only needs to be appropriately adjusted in accordance with the heat treatment temperature, is preferably from 0.01 seconds to 30 seconds, particularly preferably from 0.05 seconds to 25 seconds, more preferably from 0.1 seconds to 20 seconds. When the heat treatment time is excessively short, a curl-suppressing effect tends to be low, and when the heat treatment time is excessively long, the curl of the film is suppressed, but the solubility of the film tends to reduce.

With regard to such heat treatment temperature and heat treatment time, the heat treatment is preferably performed at high temperature for a short time period from the viewpoints of the suppression of a reduction in solubility of the film and an improvement in productivity thereof. The heat treatment is particularly preferably performed at from 90° C. to 120° C. for from 0.01 seconds to 5 seconds, and is more preferably performed at from 100° C. to 115° C. for from 0.05 seconds to 3 seconds.

The heat treatment may be typically performed with a heat roll. In addition to the foregoing, for example, heat treatment in which hot air is blown against the film with a floating dryer, or heat treatment with a far-infrared ray apparatus or an induction heating apparatus is also permitted. In the present disclosure, the heat treatment is preferably performed with a heat roll because the draw ratio is easily adjusted and because the productivity is excellent. A plurality of heat rolls may be used.

In the present disclosure, at the time of the heat treatment, out of the two surfaces of the film, a film surface side (α surface side) opposite to a film surface side (β surface side) to be brought into contact with the cast surface (e.g., the metal surface of an endless belt or a drum roll) is preferably subjected to the heat treatment, and the a surface of the film is particularly preferably brought into contact with a heat roll (heat treatment apparatus portion) in terms of the suppression of the curl of the film.

The heat-treated film thus obtained is wound in the subsequent winding step while the draw ratio is adjusted. Thus, such a PVA water-soluble film that degrees of elongation in its transverse direction and machine direction are controlled to specific degrees may be obtained.

The draw ratio is the ratio ($v_1/v_0$) of the winding speed ($v_1$) of the film in the winding step (the peripheral speed of a winding roll) to the moving speed ($v_0$) of the film in the film-forming step (in the case of a belt, the conveying speed of the belt, and in the case where a drum is used, the peripheral speed of the drum). Such draw ratio may be adjusted by appropriately controlling speeds, such as the conveying speed of the belt, the peripheral speed of the winding roll, and the peripheral speed of a heat roll (when the heat roll is used in the heat treatment step).

In addition, specifically, the draw ratio is preferably from 1.05 to 1.5, particularly preferably from 1.1 to 1.4, more preferably from 1.2 to 1.3.

When the draw ratio is smaller than 1.05, the curl-suppressing effect tends to reduce. When the draw ratio is larger than 1.5, mechanical characteristics tend to reduce; for example, strain occurs at the time of the forming of a package, or the strength of the package reduces.

In addition, in the present disclosure, the ratio ($v_1/v_2$) of the winding speed ($v_1$) of the film to the moving speed ($v_2$) of the film in the heat treatment step (when a heat roll is used in the heat treatment step, the peripheral speed of the heat roll) is preferably at least 1.0 or more because the curl-suppressing effect is easily obtained, and the ratio is particularly preferably from 1.05 to 1.4, more preferably from 1.1 to 1.3.

In the present disclosure, the film whose temperature has fallen within a specific range through the heat treatment is preferably wound at a speed higher than its moving speed in the heat treatment step, and is particularly preferably wound while an increase in winding speed of the film is started from a position near the heat treatment apparatus.

The position at which a change in winding speed ($v_1$) of the film is started is distant backward from the heat treatment apparatus by preferably 5 m or less, particularly preferably 3 m or less. When such change-starting position is excessively distant therefrom, an alleviating effect on the residual stress of the film exhibited by the heat treatment weakens, and hence the effects of the present disclosure may not be obtained.

In the present disclosure, the conveying speed of the belt (when the drum is used, the peripheral speed of the drum) is preferably from 6 m/min to 25 m/min, particularly preferably from 10 m/min to 20 m/min.

In addition, the peripheral speed of the heat roll is preferably from 6 m/min to 25 m/min, particularly preferably from 8 m/min to 20 m/min.

The peripheral speed of the winding roll around which the film is wound is preferably from 8 m/min to 40 m/min, particularly preferably from 10 m/min to 30 m/min.

Thus, the PVA water-soluble film of the present disclosure may be produced.

The thickness of the PVA water-soluble film, which is appropriately selected in accordance with its applications and the like, is preferably from 10 µm to 120 µm, particularly preferably from 15 µm to 110 µm, more preferably from 20 µm to 100 µm. When such thickness is excessively small, the mechanical strength of the film tends to reduce. When the thickness is excessively large, the rate at which the water-soluble film is dissolved in water tends to reduce, and the efficiency of film formation also tends to reduce.

The width of the PVA water-soluble film, which is also appropriately selected in accordance with the applications and the like, is preferably from 300 mm to 5,000 mm, particularly preferably from 500 mm to 4,000 mm, more preferably from 600 mm to 3,000 mm. When such width is excessively small, the production efficiency of the film tends to reduce, and when the width is excessively large, it tends to be difficult to control the sagging or thickness of the film.

The length of the PVA water-soluble film, which is also appropriately selected in accordance with the applications and the like, is preferably from 100 m to 20,000 m, particularly preferably from 800 m to 15,000 m, more preferably from 1,000 m to 10,000 m. When such length is excessively small, labor tends to be required in the switching of the film. When the length is excessively large, the appearance of the film tends to be poor owing to its tight winding, or the weight thereof tends to be excessively heavy.

In addition, the surface of the PVA water-soluble film may be plain, but in terms of the blocking resistance of the film, the slidability thereof at the time of its processing, the alleviation of adhesiveness between the films serving as products, and the appearance thereof, it is preferred that one surface or both surfaces of the film be subjected to texturing processing for imparting, for example, an embossed pattern, a fine uneven pattern, or a special engraving design.

At the time of such texturing processing, a processing temperature is typically from 60° C. to 150° C., preferably from 80° C. to 140° C. A processing pressure is typically from 2 MPa to 8 MPa, preferably from 3 MPa to 7 MPa. A processing time is typically from 0.01 seconds to 5 seconds, preferably from 0.1 seconds to 3 seconds, though the processing time varies depending on the processing pressure and the film formation speed.

In addition, cooling treatment may be performed after the texturing processing treatment as required for preventing unintentional stretching of the film due to heat.

In addition, in the present disclosure, the water content of the resultant PVA water-soluble film is preferably from 3 wt. % to 15 wt. % in terms of its mechanical strength and heat sealability, and is particularly preferably from 5 wt. % to 9 wt. %, more preferably from 6 wt. % to 8 wt. %. When such water content is excessively low, the film tends to be so hard as to reduce formability at the time of the forming of a package or the impact resistance of the package. When the water content is excessively high, its blocking tends to be liable to occur. The adjustment of the water content to such value may be achieved by appropriately setting a drying condition and a humidification condition.

The water content is measured in conformity with JIS K 6726 3.4, and the value of the resultant volatile content is defined as the water content.

In the present disclosure, the production process for the PVA water-soluble film is preferably performed under an environment at, for example, from 10° C. to 35° C., and the temperature is particularly preferably from 15° C. to 30° C. The humidity at which the process is performed is typically 70% RH or less.

In addition, the film roll obtained in the present disclosure is packaged with a packaging film formed of a resin having a water vapor barrier property, and then stored or transported, followed by being used in various applications. Such packaging film is not particularly limited, but a packaging film having a moisture permeability of 10 g/m²·24 hr (measured in conformity with JIS Z 0208) or less may be used. The packaging film is specifically, for example, a single-layer film made of a high-density polyethylene, a low-density polyethylene, a polypropylene, a polyester, a polyvinylidene chloride-coated polypropylene, a glass-deposited polyester, or the like, or a laminated film thereof, or a laminated film thereof with a split cloth, paper, or a non-woven fabric. Examples of the laminated film include: a laminated film of a glass-deposited polyester and a polyethylene; and a laminated film of a polyvinylidene chloride-coated polypropylene and a polyethylene.

Such film is preferably subjected to antistatic treatment in terms of the prevention of the inclusion of foreign matter, and an antistatic agent may be kneaded into the film or its surface may be coated with the agent. When the antistatic agent is kneaded into the film, the agent is used in an amount of from about 0.01 wt. % to about 5 wt. % with respect to the resin forming the film, and when the surface is coated with the agent, the agent is used in an amount of from about 0.01 g/m$^2$ to about 1 g/m$^2$.

For example, an alkyl diethanolamine, a polyoxyethylene alkylamine, a higher fatty acid alkanolamide, or a sorbitan fatty acid ester is used as the antistatic agent.

Next, the film roll packaged with the packaging film formed of the resin having a water vapor barrier property is preferably further packaged with a packaging film formed of an aluminum material. Examples of such film include an aluminum foil, a laminated film of an aluminum foil and a moisture-resistant plastic film (e.g., a laminated film of an aluminum foil and a polyethylene film), a laminated film of an aluminum-deposited film and a moisture-resistant plastic film (e.g., a laminated film of an aluminum-deposited polyester film and a polyethylene film), and a laminated film of an alumina-deposited film and a moisture-resistant plastic film (e.g., a laminated film of an alumina-deposited polyester film and a polyethylene film). In particular, in the present disclosure, a laminated film of an aluminum foil and a polyolefin film, or a laminated film of an aluminum-deposited film and a polyolefin film is useful, and a laminated film having a structure of a stretched polypropylene film/a polyethylene film/an aluminum foil/a polyethylene film, a laminated film having a structure of a stretched polypropylene film/a low-density polyethylene film/an aluminum foil, or the like is particularly useful.

At the time of the packaging, it is sufficient that the film roll be sequentially packaged with the packaging film formed of the resin having a water vapor barrier property serving as an inner side and the packaging film formed of the aluminum material serving as an outer side, and margins of the films in their width directions be pushed into the core pipe.

In order that flaws in the end portions of the film roll of the present disclosure and the adhesion of foreign matter, such as dust, thereto may be prevented, protective pads having core pipe through-holes may be mounted on both end portions of the film roll directly or after the film roll has been packaged with the packaging films.

A practical shape of each of the protective pads is a disc-shaped sheet or film so as to conform to the film roll. A buffer function based on, for example, a foam, a fabric shape, or a nonwoven fabric shape is desirably imparted to each of the pads for making their protective effects significant. In addition, a desiccant may be separately incorporated into the film roll, or may be laminated on or mixed in each of the protective pads for protecting the film roll from moisture.

An advantageous material for each of the protective pads is a plastic, and specific examples thereof include a polystyrene, a polyethylene, a polypropylene, a polyester, and a polyvinyl chloride.

In addition, examples of the protective pad containing the desiccant include: a moisture-absorbing layer obtained by dispersing or impregnating a desiccant or a water-absorbing agent, such as calcium chloride, silica gel, a molecular sieve, a saccharide, in particular, a saccharide having a high osmotic pressure, or a water-absorbing resin, in a formable material, such as a natural cellulose, a synthetic cellulose, a glass cloth, or a nonwoven fabric, or applying the desiccant or the water-absorbing agent to the material, and drying the material having dispersed or impregnated therein, or applied thereto the desiccant or the water-absorbing agent; and a product obtained by sandwiching such desiccant or water-absorbing agent between the formable materials or thermoplastic resin films, such as a polyester film, a polyethylene film, a polypropylene film, and a Teflon (trademark) film.

As examples of a commercially available sheet-shaped desiccant, there are given "I.D. Sheet" manufactured by ID Corporation, "ALLOSHEET" and "ZEOSHEET" manufactured by Shinagawa Chemical Industry Co., Ltd., and "Hi-Sheet Dry" manufactured by Hi-Sheet Industries.

The film roll packaged with such means is preferably stored or transported under a so-called air-floating state without being in contact with the ground by being supported through the arrangement of brackets (support plates) at protruding portions at both ends of the core pipe or the mounting of the protruding portions at both ends on stands. When the width of the film is relatively small, the brackets are used, and when the width of the film is relatively large, the stands are used.

Each of the brackets is formed of plywood or a plastic plate, and its size only needs to be such that the four sides of the bracket are larger than the diameter of the film roll.

Then, a pair of the brackets is arranged on the film roll as follows: the brackets are vertically placed at the core pipe-protruding portions at both ends of the film roll so as to face each other, and are fitted thereinto. The fitting may be performed by arranging a bored hole somewhat larger than the diameter of the core pipe in the central portion of each of the brackets or boring a range from the upper portion of each of the brackets to the central portion thereof in a U-shaped manner so that the core pipe may be easily inserted.

The film roll supported with the brackets is stored or transported after having been accommodated in a carton, such as a cardboard box. However, in order that the operation at the time of the accommodation may be smoothly performed, when rectangular brackets are used, the four corners of each of the brackets are preferably cut off.

In addition, it is advantageous to fix both the brackets with a binding tape so that the pair of brackets may not wobble, and at the time, it is practical to arrange a tape shift-preventing groove comparable in size to the width of the tape on a side surface (thickness portion) of each of the brackets so that the movement or sagging of the tape may not occur.

At the time of the storage or transportation of the packaged film roll, an extremely high temperature condition, an extremely low temperature condition, an extremely low humidity condition, and an extremely high humidity condition are desirably avoided. Specifically, a temperature of from 10° C. to 30° C. and a humidity of from 40% RH to 75% RH are preferred.

The water-soluble film of the present disclosure thus obtained is excellent in shape stability at the time of long-term storage and impact resistance at low temperature, and is hence useful in, for example, various packaging applications, such as: an application where a chemical agent, such as an agricultural chemical or a detergent, is packaged as a unit; a (water pressure) transfer film; a sanitary product, such as a napkin or a paper diaper; a waste disposal product, such as an ostomy bag; a medical product, such as a blood-absorbing sheet; and a temporary substrate, such as a raising seedling sheet, a seed tape, or a base fabric for embroidery.

The water-soluble film of the present disclosure may be particularly suitably used in an application where a chemical agent is packaged as a unit.

<Chemical Agent Package>

A chemical agent package of the present disclosure is a package obtained by including a chemical agent in the PVA water-soluble film of the present disclosure. The chemical agent is packaged with the water-soluble film. Accordingly, after the package has been loaded in its entirety into water and the water-soluble film has been dissolved, the chemical agent is dissolved or dispersed in the water to express its effect. Accordingly, the chemical agent package is suitable for a chemical agent package having packaged therein a relatively small amount of a chemical agent corresponding to, for example, a single use.

Examples of the chemical agent to be included in the film include: an agricultural chemical, such as a pesticide, a sterilizing agent, or an herbicide; a fertilizer; and a detergent. Of those, the detergent is particularly preferred. The form of the chemical agent may be a liquid or a solid. In the case of the liquid, the chemical agent is a liquid chemical agent, and in the case of the solid, the chemical agent is, for example, a granular, tablet-like, or powdery chemical agent. The chemical agent is preferably a chemical agent to be used by being dissolved or dispersed in water. In the present disclosure, a liquid detergent is particularly preferably included in the film. In addition, the pH of the chemical agent may fall within any one of the alkaline, neutral, and acidic regions.

The surface of the chemical agent package is typically, for example, smooth. However, the outer surface of a package bag (the PVA water-soluble film) may be subjected to texturing processing for imparting, for example, an embossed pattern, a fine uneven pattern, or a special engraving design in terms of the blocking resistance of the chemical agent package, the slidability thereof at the time of its processing, the alleviation of adhesiveness between the products (packages), and the appearance thereof.

A liquid detergent package serving as an example of the chemical agent package of the present disclosure is described below.

The liquid detergent package holds such a shape as to include a liquid detergent therein at the time of its storage. In addition, at the time of the use of the package (at the time of laundry), the package bag (water-soluble film) is brought into contact with water. Accordingly, the package bag is dissolved, and hence the liquid detergent included therein flows out of the package bag.

With regard to the size of the liquid detergent package, its length is typically from 10 mm to 50 mm, preferably from 20 mm to 40 mm.

In addition, the film thickness of the package bag formed of the PVA water-soluble film is typically from 10 μm to 120 μm, preferably from 15 μm to 110 μm, more preferably from 20 μm to 100 μm.

The amount of the liquid detergent to be included in the package bag is typically from 5 mL to 50 mL, preferably from 10 mL to 40 mL.

When the chemical agent package is provided by packaging the liquid detergent with the PVA water-soluble film of the present disclosure, a known method may be adopted.

The chemical agent package is produced by, for example, bonding two PVA water-soluble films to each other. One film (bottom film) is fixed onto a die present in the lower portion of a forming apparatus, and the other film (top film) is also fixed to the upper portion of the apparatus. The bottom film is heated with a dryer, and is subjected to vacuum forming into the shape of the die. After that, the liquid detergent is loaded into the formed film, and then the top film and the bottom film are pressure bonded to each other. After the pressure bonding, a vacuum is released. Thus, the package may be obtained.

Examples of a method of pressure bonding the films to each other include (1) a heat sealing method, (2) a water sealing method, and (3) an adhesive sealing method. Of those, (2) the water sealing method is versatile and advantageous.

When water is applied at the time of the water sealing, a film typically tends to be liable to curl. However, the PVA water-soluble film of the present disclosure is suppressed from curling, and hence the positional shift of a sealed portion due to a curl hardly occurs and the water sealing strength thereof is satisfactory. Accordingly, the film is suitably used in the water sealing method.

The pH value of the liquid detergent when dissolved or dispersed in water is preferably from 6 to 12, particularly preferably from 7 to 11. In addition, the water content of the liquid detergent is preferably 15 wt. % or less, particularly preferably from 0.1 wt. % to 10 wt. %, more preferably from 0.1 wt. % to 7 wt. %. When the conditions are satisfied, the water-soluble film does not gel or become insoluble, and is hence excellent in water solubility.

The pH value is measured in conformity with JIS K 3362 8.3. In addition, the water content is measured in conformity with JIS K 3362 7.21.3.

EXAMPLES

Now, the present disclosure is more specifically described by way of Examples. The present disclosure is not limited to Examples below without departing from the gist of the present disclosure.

The terms "part(s)" and "%" in the examples are on a weight basis.

Example 1

90 Parts of a carboxyl group-modified PVA resin (A1) having a 4% aqueous solution viscosity at 20° C. of 22 mPa·s, an average saponification degree of 97 mol %, and a modification amount with maleic acid monomethyl ester of 2.0 mol %, and 10 parts of an unmodified PVA resin (A2) having a 4% aqueous solution viscosity at 20° C. of 18 mPa·s and an average saponification degree of 88 mol %, the resins serving as the PVA resins (A), 20 parts of sorbitol (b1) and 20 parts of glycerin (b2) serving as the plasticizers (B), 8 parts of starch (average particle diameter: 20 μm) serving as the filler (C), 2 parts of a polyoxyalkylene alkyl ether phosphate monoethanolamine salt serving as the surfactant (D), and water were mixed to provide a film-forming raw material serving as an aqueous dispersion of a resin composition having a solid content concentration of 25%.

Then, the film-forming raw material was cast on the belt of a belt film-forming machine including a stainless steel-made endless belt, and was dried at 110° C. to provide a PVA water-soluble film ($F_0$). After that, as shown in Table 1 below, the film was further subjected to heat treatment with a heat treatment roll at a roll temperature of 110° C. for a contact time of 0.1 seconds, followed by the winding of the film. Thus, a PVA water-soluble film ($F_1$) was obtained (film width: 600 mm, film length: 300 m, film thickness: 87 μm, water content: 7.0%).

The temperature of the heat-treated film was 70° C., and a draw ratio was 1.25 (belt speed: 12 m/min, winding speed: 15 m/min).

Film physical properties were measured and evaluated by using the PVA water-soluble film ($F_1$) thus obtained in accordance with the following methods. The results are shown in Table 1 below.

[Degree of Elongation]
(Measurement Method)

The resultant PVA water-soluble film ($F_1$) was left to stand at 23° C. under a humidification condition of 50% RH for 24 hours. After that, the film was cut into a size measuring 150 mm by 150 mm under the environment, and a circle having a diameter of 75 mm was drawn in the central portion thereof with a water-based pen.

Further, lines ($S_{TD0}$) and ($S_{MD0}$) parallel to the TD and MD of the film, respectively, the lines each having a length equal to the diameter, that is, 75 mm, were drawn in the circle.

Next, the PVA water-soluble film was floated near the center of a water bath measuring 350 mm long by 250 mm wide, which was filled with water at 20° C., with its surface having drawn thereon the circle directed upward.

The lengths of two lines ($S_{TD60}$) and ($S_{MD60}$) drawn parallel to the TD and the MD, respectively 60 seconds after the film had been floated on the water surface were each measured, and the degree of elongation ($X_{TD}$) in the TD and the degree of elongation ($X_{MD}$) in the MD were each calculated from the ratio of the length after the elongation to the length before the elongation, followed by the determination of the ratio ($X_{TD}/X_{MD}$) therebetween.

The degree of elongation ($X_{TD}$) in the TD and the degree of elongation ($X_{MD}$) in the MD were calculated in accordance with the following equations.

$$X_{TD}(\%) = S_{TD60}/S_{TD0} \times 100$$

$$X_{MD}(\%) = S_{MD60}/S_{MD0} \times 100$$

[Curling Property]
(Evaluation Method)

The resultant PVA water-soluble film ($F_1$) was cut into a size measuring 300 mm in its machine direction (MD) by 200 mm in its transverse direction (TD). One side in the TD of the film was fixed as illustrated in the FIGURE, and the film was hung under an environment at 23° C. and 50% RH for 24 hours. The length (A) of the curl diameter of the film when viewed from its lower portion at the time of the hanging was measured, and was evaluated by the following evaluation criteria. When curl diameters at both ends of the film differed from each other, the smaller numerical value was adopted as the length (A) of the curl diameter.

When a curl shape was a perfect circle, the length of the diameter of the perfect circle was defined as the length (A) of the curl diameter, and when the curl shape was an ellipse, a numerical value obtained by averaging the length of the long diameter of the ellipse and the length of the short diameter thereof (calculated from the equation "(length of long diameter+length of short diameter)/2") was defined as the length (A) of the curl diameter.

(Evaluation Criteria)

o . . . The length (A) of the curl diameter is 15 mm or more, and hence film curve deformation along with the curl is loose.

x . . . The length (A) of the curl diameter is less than 15 mm, and hence the film curve deformation along with the curl is strong.

[Water Sealability: Peel Strength of Water-sealed Portion]

The PVA water-soluble film ($F_1$) obtained in the foregoing was subjected to moisture conditioning under an environment at 23° C. and 40% RH for 24 hours. After that, the film was cut out of the central portion in the transverse direction of the film into a square shape measuring 50 mm by 50 mm so that one side thereof was parallel to the MD. Thus, a PVA water-soluble film (I) was obtained. In addition, the film was cut out of the central portion in the transverse direction of the film into such a rectangle that the length of one side parallel to the MD was 70 mm and the length of one side parallel to the TD was 15 mm. Thus, a PVA water-soluble film (II) was obtained.

The PVA water-soluble film (I) was mounted on a 30-centimeter square glass plate with its cast surface directed upward, and water was applied in a circle shape having a diameter of 1 cm at 1 g/cm² to the PVA water-soluble film (I) with a swab (antibacterial swab manufactured by Justneo Co., Ltd.) filled with a sufficient amount of water. Next, 5 seconds after the completion of the water application, the cast surface side of the PVA water-soluble film (II) was mounted on the PVA water-soluble film (I), and a weight of 85 g was slowly mounted on the resultant, and was left to stand as it was for 10 seconds to water seal (bond) the two PVA water-soluble films. Thus, a measurement test piece was obtained.

(Evaluation Method)

The peel strength of the water-sealed portion was measured and evaluated through the use of the measurement test piece after the lapse of 10 seconds from the mounting of the weight by the following method.

Of the two PVA water-soluble films of the measurement test piece, the PVA water-soluble film (I) was fixed to a substrate glass. A spring balance was attached to an end portion of the PVA water-soluble film (II), and the peel strength (g/15 mm) was measured by pulling the film upward at a speed of 2 mm/sec. The measurement was performed under an environment at 23° C. and 40% RH.

[Water Sealability: Presence or Absence of Curl]

At the time of the preparation of the measurement test piece, the presence or absence of a curl in an end portion of the PVA water-soluble film (I) 5 seconds after the water application was visually observed.

[Production and Evaluation of Liquid Detergent Package]

A liquid detergent package was produced from the PVA water-soluble film ($F_1$) obtained in the foregoing with a package-producing machine manufactured by Engel by the following procedure.

That is, one film (bottom film, size: 120 mm long by 150 mm wide) was fixed onto a die (measuring 41.5 mm long by 46.5 mm wide by 20 mm deep) present in the lower portion of the apparatus with its TD aligned with a longitudinal direction, and another film (top film, size: 80 mm long by 120 mm wide) was also fixed to the upper portion of the apparatus with its MD aligned with a lateral direction. After that, the bottom film was heated with a dryer configured to generate hot air at 90° C. for 10 seconds, and the bottom film was subjected to vacuum forming into the shape of the die. Next, a liquid detergent packaged in POWER GEL BALL manufactured by P&G (part of components: 5.4% of glycerin, 22.6% of propylene glycol, 10.4% of water) was removed, and 20 mL thereof was loaded into the formed film. Subsequently, 1.5 g of water was applied to the entire surface of the top film, and the top film and the bottom film were pressure bonded to each other. After the films had been pressure bonded to each other for 30 seconds, a vacuum was released. Thus, the liquid detergent package was obtained.

A length $L_{TD}$ (mm) in the longitudinal direction (TD) of the liquid detergent package obtained in the foregoing, and a length $L_{MD}$ (mm) in the lateral direction (MD) thereof were measured, and the longitudinal direction shrinkage ratio ($Y_{TD}$) and lateral direction shrinkage ratio ($Y_{MD}$) of the liquid detergent package with respect to the length of the die were calculated in accordance with the following equations.

$$Y_{TD}(\%)=L_{TD}/41.5\times100$$

$$Y_{MD}(\%)=L_{MD}/46.5\times100$$

The ratio ($Y_{TD}/Y_{MD}$) of the longitudinal direction shrinkage ratio ($Y_{TD}$) of the resultant liquid detergent package to the lateral direction shrinkage ratio ($Y_{MD}$) thereof was determined, and the appearance characteristic of the package was evaluated as described below.
(Evaluation Criteria)
o . . . $0.9 \leq Y_{TD}/Y_{MD} \leq 1.1$
(Shrinkage anisotropy at the time of the forming of the package is small, and hence the shape stability of the package is satisfactory.)
x . . . $Y_{TD}/Y_{MD}<0.9$ or $Y_{TD}/Y_{MD}>1.1$
(The shrinkage anisotropy at the time of the forming of the package is large, and hence the deformation of the package is liable to occur.)

Comparative Example 1

In Example 1, after the PVA water-soluble film ($F_0$) had been obtained, the film was wound without the performance of any heat treatment. Thus, a PVA water-soluble film ($F'_1$) (film width: 1,000 mm, film length: 300 m, film thickness: 87 μm, water content: 7.0%) was obtained. The temperature of the film that had not been subjected to any heat treatment was 30° C., and a draw ratio was 1.04 (belt speed: 12 m/min, winding speed: 12.5 m/min).

Comparative Example 2

In Example 1, after the PVA water-soluble film ($F_0$) had been obtained, the film was further subjected to heat treatment with a heat treatment roll at a roll temperature of 60° C. for a contact time of 12 seconds, followed by the winding of the film. Thus, a PVA water-soluble film ($F'_2$) was obtained (film width: 1,000 mm, film length: 300 m, film thickness: 87 μm, water content: 7.0%).

The temperature of the film that had been subjected to the heat treatment was 60° C., and a draw ratio was 1.60 (belt speed: 12 m/min, winding speed: 19.2 m/min).

Comparative Example 3

In Example 1, after the PVA water-soluble film ($F_0$) had been obtained, the film was further subjected to heat treatment with a heat treatment roll at a roll temperature of 60° C. for a contact time of 12 seconds, followed by the winding of the film. Thus, a PVA water-soluble film ($F'_3$) was obtained (film width: 1,000 mm, film length: 300 m, film thickness: 87 μm, water content: 7.0%).

The temperature of the film that had been subjected to the heat treatment was 60° C., and a draw ratio was 1.04 (belt speed: 12 m/min, winding speed: 12.5 m/min).

TABLE 1

| | Production of PVA water-soluble film | | | PVA water-soluble film | | | Curling property | |
|---|---|---|---|---|---|---|---|---|
| | Film temperature (° C.) | Heat treatment conditions Temperature (° C.)/time (sec) | Draw ratio | Degree of elongation | | | Curl diameter (mm) | Evaluation |
| | | | | $X_{TD}$ (%) | $X_{MD}$ (%) | $X_{TD}/X_{MD}$ | | |
| Example 1 | 70 | 110° C./0.1 sec | 1.25 | 136 | 116 | 1.17 | 25 | o |
| Comparative Example 1 | 30 | No heat treatment | 1.04 | 124 | 120 | 1.03 | 11 | x |
| Comparative Example 2 | 60 | 60° C./12 sec | 1.60 | 152 | 92 | 1.65 | 23 | o |
| Comparative Example 3 | 60 | 60° C./12 sec | 1.04 | 125 | 120 | 1.04 | 10 | x |

| | PVA water-soluble film Water sealability | | Package | | | |
|---|---|---|---|---|---|---|
| | Peel strength (g/15 mm) | Curl | Shrinkage ratio | | | |
| | | | $Y_{TD}$ (%) | $Y_{MD}$ (%) | $Y_{TD}/Y_{MD}$ | Evaluation |
| Example 1 | 180 | Absent | 90.4 | 86.2 | 1.05 | o |
| Comparative Example 1 | 170 | Present | 86.3 | 87.5 | 0.99 | o |
| Comparative Example 2 | 160 | Absent | 98.6 | 76.3 | 1.29 | x |
| Comparative Example 3 | 160 | Present | 86 | 87.9 | 0.98 | o |

As can be seen from the results of Table 1 above, in the water-soluble film of Example 1, the ratio ($X_{TD}/X_{MD}$) of the degree of elongation ($X_{TD}$) in the transverse direction (TD) to the degree of elongation ($X_{MD}$) in the machine direction (MD) satisfies a specific range, and hence the film is suppressed from curling and has satisfactory water sealability, and when a package is formed by using the film, a package free of strain and excellent in appearance characteristic is obtained.

In contrast, it is found that, in each of the water-soluble films of Comparative Example 1 and Comparative Example 3 in each of which the ratio ($X_{TD}/X_{MD}$) between the degrees of elongation is small and hence does not satisfy a specific range, a curl is large, and hence there is an obstacle to the forming of a package, thereby resulting in poor productivity.

In addition, it is found that, in the water-soluble film of Comparative Example 2 in which the ratio ($X_{TD}/X_{MD}$) between the degrees of elongation is excessively large, a curl is suppressed, but strain at the time of the forming of a package is large, and hence the package is poor in appearance characteristic.

Specific modes in the present disclosure have been described in Examples described above, but Examples described above are merely illustrative and should not be construed as being limitative. Various modifications apparent to a person skilled in the art are meant to fall within the scope of the present disclosure.

The water-soluble film of the present disclosure is a water-soluble film suppressed from curling, and hence the film hardly causes a positional shift and shows satisfactory sealability at the time of the forming of a package. Further, the deformation of the package is suppressed. Accordingly, a package excellent in appearance characteristic is obtained. Therefore, the film can be used in various packaging applications, and is particularly useful in an application where a chemical agent or the like, in particular, a liquid detergent is individually packaged.

The invention claimed is:

1. A water-soluble film, comprising a polyvinyl alcohol resin (A) as a main component,
   wherein a ratio (XTD/XMD) of a degree of elongation (XTD) in a transverse direction (TD) of the water-soluble film to a degree of elongation (XMD) in a machine direction (MD) thereof during testing conditions wherein the water-soluble film is floated on a surface of water at 20° C. for 60 seconds is from 1.05 to 1.5;
   wherein the water-soluble film is obtained by casting a film-forming material containing the polyvinyl alcohol resin (A), followed by drying to form a film; subjecting the film obtained by the film formation to heat treatment at from 50° C. to 120° C.; and winding the heat-treated film at a draw ratio of from 1.05 to 1.5;
   wherein the polyvinyl alcohol resin (A) comprises an anionic group-modified polyvinyl alcohol resin; and
   wherein an average saponification degree of the polyvinyl alcohol resin (A) is from 80 mol % to 95.0 mol %.

2. The water-soluble film according to claim 1, wherein the water-soluble film has a water content of from 3 wt. % to 15 wt. %.

3. The water-soluble film according to claim 1, wherein the water-soluble film is used for chemical agent packaging.

4. A chemical agent package, comprising:
   a package bag formed of the water-soluble film of claim 1; and
   a chemical agent packaged in the package bag.

5. The chemical agent package according to claim 4, wherein the chemical agent comprises a detergent.

6. The chemical agent package according to claim 5, wherein the detergent comprises a liquid detergent.

7. A method of producing the water-soluble film of claim 1, the method comprising:
   casting a film-forming material containing the polyvinyl alcohol resin (A), followed by drying to form a film;
   subjecting the film obtained by the film formation to heat treatment so that a temperature thereof is from 50° C. to 95° C.; and
   winding the heat-treated film at a draw ratio of from 1.05 to 1.5.

* * * * *